No. 642,641. Patented Feb. 6, 1900.
H. F. SMITH.
STENCIL MAKING MACHINE.
(Application filed Aug. 20, 1898.)
(No Model.) 8 Sheets—Sheet 1.

Fig. 1.

Witnesses
W. J. Norton
S. E. Zimmerman

Inventor
Howard F. Smith
by F. L. Browne
his Attorney

No. 642,641. Patented Feb. 6, 1900.
H. F. SMITH.
STENCIL MAKING MACHINE.
(Application filed Aug. 20, 1898.)
(No Model.) 8 Sheets—Sheet 4.

Witnesses
W. J. Norton
S. E. Zimmerman

Inventor
Howard F. Smith
by F. H. Browne
his Attorney

THE NORRIS PETERS CO., PHOTO-LITHO., WASHINGTON, D. C.

No. 642,641. Patented Feb. 6, 1900.
H. F. SMITH.
STENCIL MAKING MACHINE.
(Application filed Aug. 20, 1898.)
(No Model.) 8 Sheets—Sheet 5.

Witnesses
W. J. Norton
S. E. Zimmerman

Inventor
Howard F. Smith
by F. W. Browne
his Attorney

UNITED STATES PATENT OFFICE.

HOWARD F. SMITH, OF ELKHART, INDIANA.

STENCIL-MAKING MACHINE.

SPECIFICATION forming part of Letters Patent No. 642,641, dated February 6, 1900.

Application filed August 20, 1898. Serial No. 689,126. (No model.)

*To all whom it may concern:*

Be it known that I, HOWARD F. SMITH, a citizen of the United States, residing at Elkhart, in the county of Elkhart and State of Indiana, have invented certain new and useful Improvements in Stencil-Making Machines; and I do hereby declare the following to be a full, clear, and exact description of the invention, such as will enable others skilled in the art to which it appertains to make and use the same.

This invention is directed to improvements in machines or appliances for the production of stencils, the object of the improvements being to secure in such a machine or appliance simplicity and durability of construction, ease of operation, and perfection in the finished article.

Generally speaking, the invention combines means for intermittently feeding the strip of material from which the stencil is made into position to receive the character-perforations; means for governing such feed to secure in the stencil properly-spaced letters, words, signs, and the like; means for shifting the strip transversely to present different lines to receive the perforations; means, in the nature of punches and dies, for perforating the strip; means for accurately positioning and retaining the punches and dies in relation to the strip, and means for operating the punches to effect the perforations.

The details of construction and relative arrangement of parts of my improved stencil-making machine are set forth in the following description, reference being made therein to the accompanying drawings, in which—

Referring to the said drawings by letter, A denotes the frame of the machine, which consists of a base $a$, of skeleton form, having the main circular portion $a'$ and the extensions $a^2$ and $a^3$. Centrally of the portion $a'$ of said base is a tubular standard $a^4$, in which is fitted a tubular spindle $b$, having a reduced upper end $b'$ and below such reduced portion longitudinal slots $b^2$. Mounted to rotate on the reduced portion $b'$ of the spindle are the punch-wheel C and die-wheel D, which are rigidly connected with each other and also with a pinion $e$. These wheels and pinion are confined between the shoulder formed by the reduced portion $b'$ and a nut $b^3$, which is screwed onto the upper end of the spindle. The punch-wheel is provided in its rim with an annular series of circular openings $c\ c$, each of which receives a punch F, it being understood that for each character required a separate punch is employed. Each of the punches comprises a tubular body $f$, internally threaded at its ends to receive screw-plugs $f'\ f^2$, the plug $f^2$ having in its under side the character-punch, as shown. The body $f$ is provided with a spline $f^3$, which by engagement with a groove $c'$, provided in the side of each opening $c$, prevents the punch from turning, while at the same time it permits longitudinal movement. The body of the punch is slotted in opposite sides, and through these slots and the side of the opening $c$ is passed a bridge-pin $f^4$, between which and the upper plug $f'$ is confined a coiled spring $f^5$. In practice after a punch has been depressed to form the character-perforation the action of the spring restores it to its normal elevated position. The die-wheel D is provided in its rim with an annular series of openings $d\ d$, corresponding in number and position to the openings $c$ in the punch-wheel. Around the openings $d$ the die-wheel is depressed to provide recesses, in which are removably held die-blocks of segmental form, the top of the blocks being flush with the top of the die-wheel. In each block are cuts for characters, the cuts acting as dies.

Figure 12:
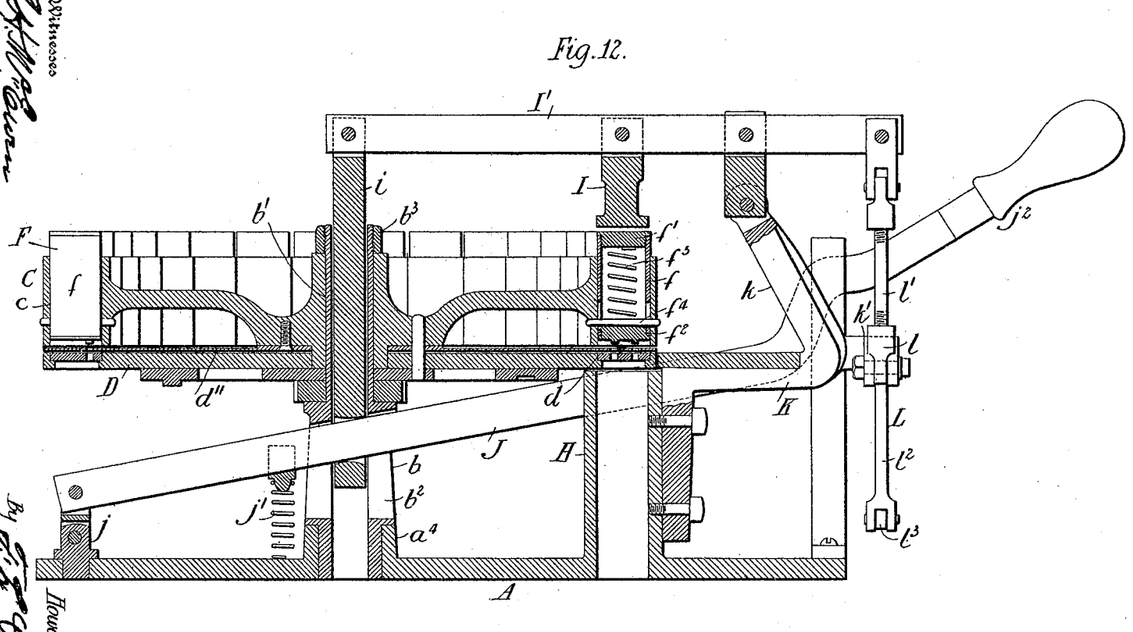
Fig. 12 is a vertical sectional view of the machine, taken on line 12 12, Fig. 1.
Figures 13, 14:
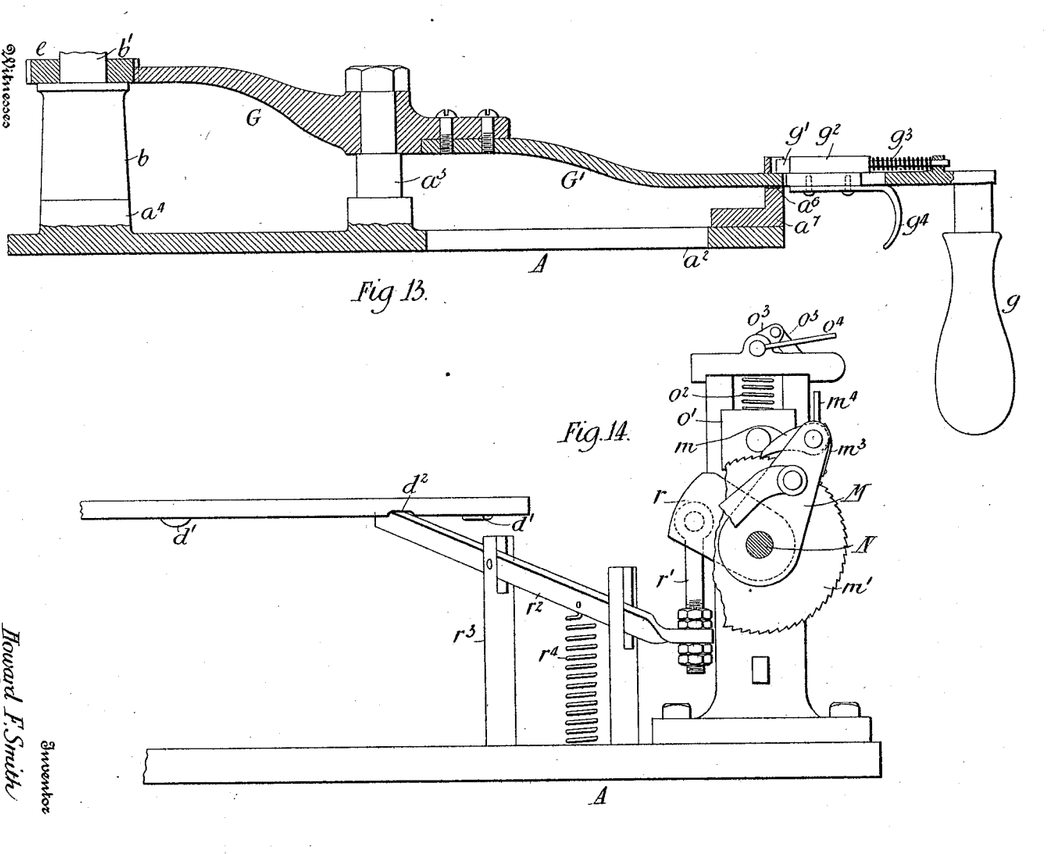
Fig. 13 is a fragmentary sectional view of the punch and die wheel shifting mechanism, taken on line 13 13, Fig. 1.
Fig. 14 is an enlarged fragmentary view in elevation, partly in section, of the strip-feeding mechanism, showing the means for governing the feed to secure properly-spaced characters.
Figure 15:
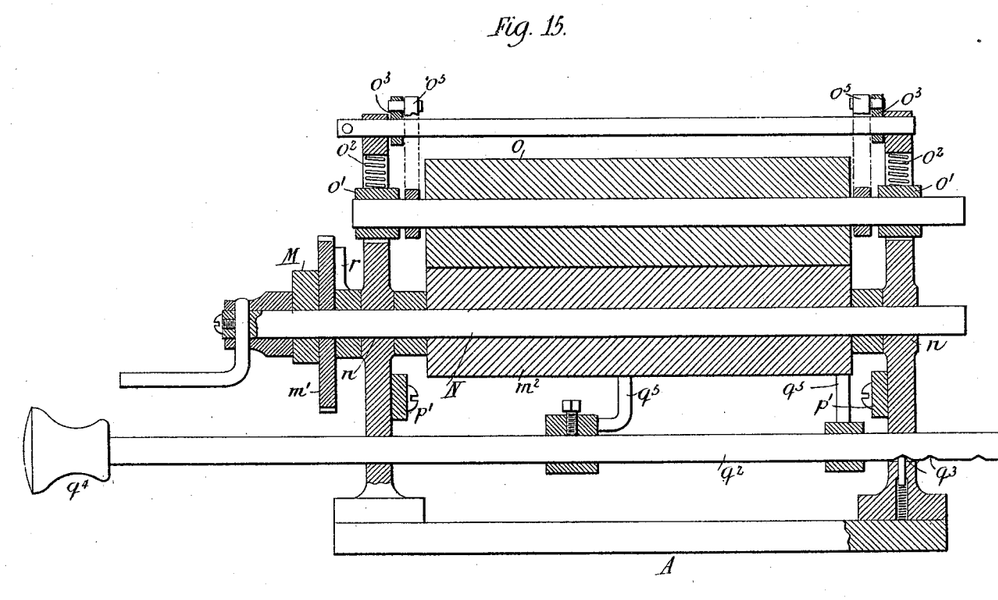
Fig. 15 is an enlarged vertical sectional view of the strip-feeding mechanism, taken on line 15 15, Fig. 1.

$d''$ is a stripper-plate interposed between the die-wheel and punch-wheel and secured to the under side of the latter, as shown in Fig. 12. This stripper-plate is provided with character-perforations corresponding to those of the punches and dies and operates to strip the punch in a manner readily comprehended.

G denotes a segmental rack-bar the teeth of which mesh into the teeth of the pinion $e$, said bar being pivotally supported on a standard $a^5$ on the frame extension $a^2$. An arm G', which is rigidly connected with the rack-bar, extends outwardly through a slot $a^6$, provided in a segmental portion $a^7$ of the frame extension $a^2$, and terminates in a downwardly-projecting handle $g$. On the outer side of the segmental portion $a^7$, above the slot $a^6$, are notches corresponding in number to the number of character-punches and so marked as to indicate the relative disposition of the latter. A finger $g'$ is carried by the arm G', said finger being movable with a block $g^2$, and a spring $g^3$ is employed to move the finger to bring the inner tapered end into engagement with one of the notches aforesaid. $g^4$ is a trigger which is connected to the finger to enable the latter to be moved backward by hand to disengage its end from a notch. The punch and die wheels being rigid with the pinion and the latter having meshing engagement with the rack-bar G, any movement of the arm G' is communicated to said wheels, and it will therefore be understood that when said arm and bar are moved to bring the finger opposite a certain character indicated on the notched segmental portion $a^7$ such movement will bring the corresponding punch and die into proper position for the perforating operation.

H denotes a tubular anvil which may be formed integrally with the base $a$ and which extends upward to, but is out of contact with, the rim of the die-wheel. The opening of the anvil is in the path of the punches and die-blocks and is of the same size in cross-section as the openings $d$ in the die-wheel. In practice the material cut from the strip falls through said opening into a suitable receptacle. The punches are depressed to effect the perforations in the strip by the action of a hammer I, arranged in the path of the punches above the latter and carried by a bar I', the inner end of which has pivotal connection with a rod $i$, vertically movable in the tubular spindle $b$. The lower end of the rod $i$ is slotted and is pivotally connected with a lever J, which is passed through the slots $b^2$ in the spindle and is therefore capable of vertical movement to effect the depression of the hammer and punch through the rod $i$ and bar I'. One end of this lever J is pivoted to the frame, as at $j$, and between this pivotal connection and the connection with the rod $i$ is a coiled spring $j'$, confined between the lever and the base, said spring being compressed in the downward movement of the lever and operating to restore the latter when released to its normal elevated position. Near its outer end the lever J is offset, and at its end is a handle $j^2$.

Referring more particularly to Fig. 12, K denotes a bracket secured to the frame, its upper arm $k$ being bifurcated at its outer end and pivotally connected with the bar I'. Pivotally secured to this bracket at $k'$ is a bell-crank lever L, one arm $l$ of which has rod connection with the outer end of the bar I'. This rod, which is lettered $l'$, has opposite threads at its ends to permit of adjustment. The other arm $l^2$ of the lever L is connected, by means of a rod $l^3$, with a crank-arm M, which is loosely mounted on a shaft N, journaled in bearings $n$ $n$ on the frame. This crank-arm carries at its upper end a spring-controlled pawl $m$, which is adapted to engage the teeth of a ratchet-wheel $m'$, said wheel being rigid with a roller $m^2$, fixedly mounted on the shaft N. This roller $m^2$, together with a roller $o$, mounted above it, constitutes the strip-feeding means, the strip, whether it be supplied from the roll $p$ or otherwise, being passed between the aforesaid rollers and thence between the punch and die wheels. The spring $m^3$ for the pawl $m$ engages a shoulder which is provided on the latter above its pivot, whereby the spring operates to hold the pawl either into or out of engagement with the ratchet-wheel $m'$, said pawl carrying an arm $m^4$, by which such engagement and disengagement may be effected by hand. The upper feed-roller $o$ is mounted in movable bearings $o'$, and $o^2$ are springs which are interposed between said bearings and the frame and operate to press the roller $o$ upon its companion roller $m^2$. This roller $o$ is provided with means by which it may be raised free from the roller $m^2$ to permit of the insertion of the strip, said means consisting of a crank-arm $o^3$, journaled to the frame and provided with a handle $o^4$, and of a rod $o^5$, which connects the arm and bearing, whereby movement of the arm lowers or raises the feed-roller $o$ to bring it into or out of contact with the roller $m^2$.

The roll $p$ is removably mounted in the outer ends of arms $p'$ $p'$, extending from the frame, and is provided with flanges $p^2 p^2$, between which the material—say paper—is wound. If the nature of the material will not admit of its being wound upon the roll, then it is fed between the flanges $p^2$, the latter serving as guides. The means for shifting the strip transversely to bring a new line to be perforated consists of an arm $q$, the outer end of which is bifurcated and engages an annular groove $q'$, provided in the roll $p$ beyond one of its flanges, while the inner end of the arm is fixed to a rod $q^2$, which is movable in openings in the frame. This rod $q^2$ has in its under side recesses $q^3$, any one of which is adapted to be engaged by a spring-button to lock the rod in position. The rod carries at its outer end a knob $q^4$, and obviously by moving the rod in or out the roller $o$, together with the strip, will be shifted to present any part of the latter beneath the punches. On the rod $q^2$ are guides in the shape of fingers $q^5$, between which the strip is passed.

The strip of material is intermittently fed by the movement of the bar I', through the bell-crank lever L, pawl $m$, and ratchet-wheel $m'$, and means are provided for governing such feed to secure in the stencil properly-spaced matter regardless of the varying widths of the different characters, such means consisting of a cam $r$, loosely mounted on the shaft N and connected by a rod $r'$ with one end of a lever $r^2$, pivoted to a standard $r^3$ on the frame. This cam $r$ has a beveled point which is adapted when moved to engage the pawl and raise it out of engagement with the ratchet-wheel, thereby governing the feed of the strip to accord with the varying widths of characters. The other end of the lever $r^2$ is arranged in the path of a series of projections $d'$ and depressions $d^2$, provided in the under side of the die-wheel D.

Figure 1:
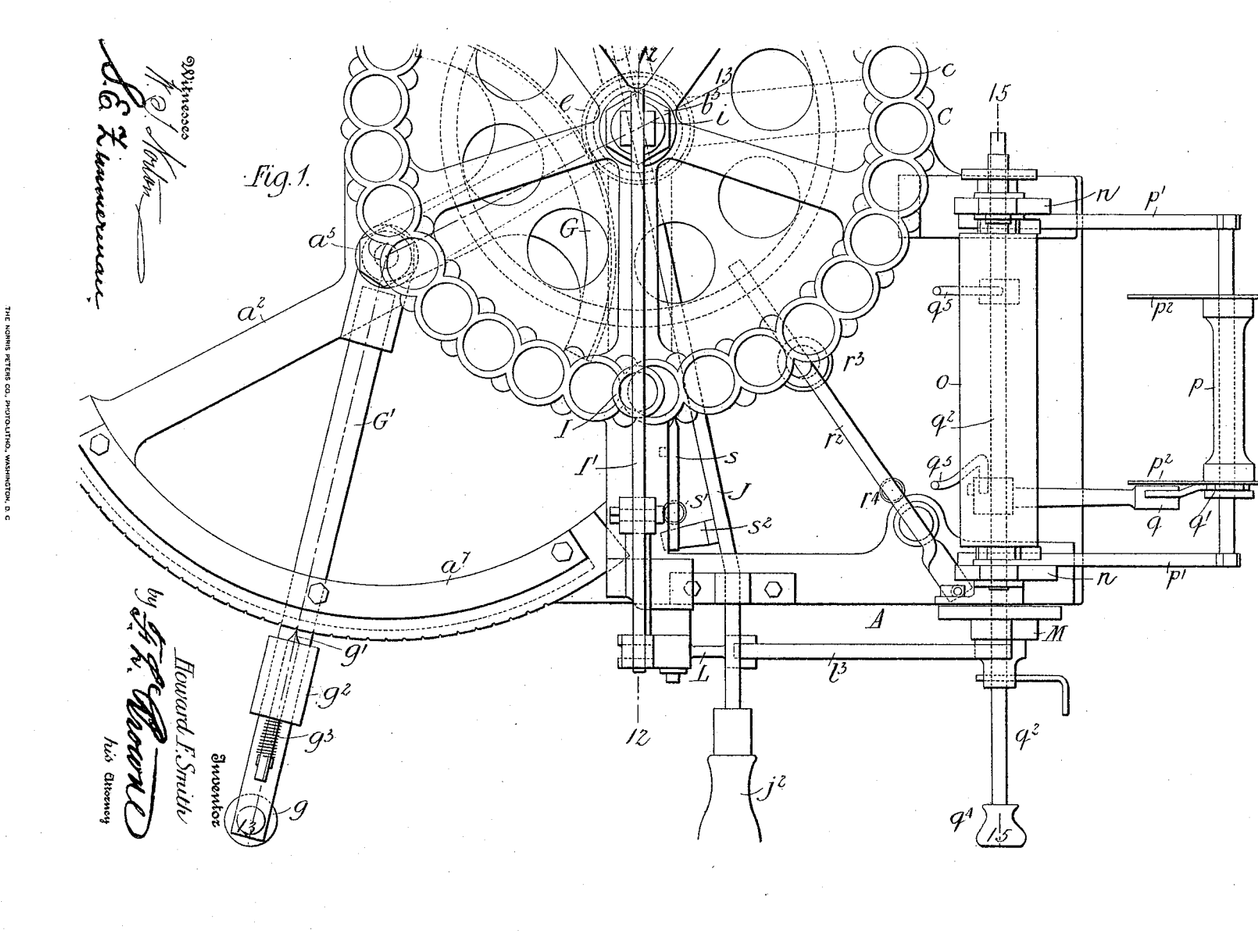
Figure 1 is a plan view of a stencil-making machine embodying my invention.
Figure 2:
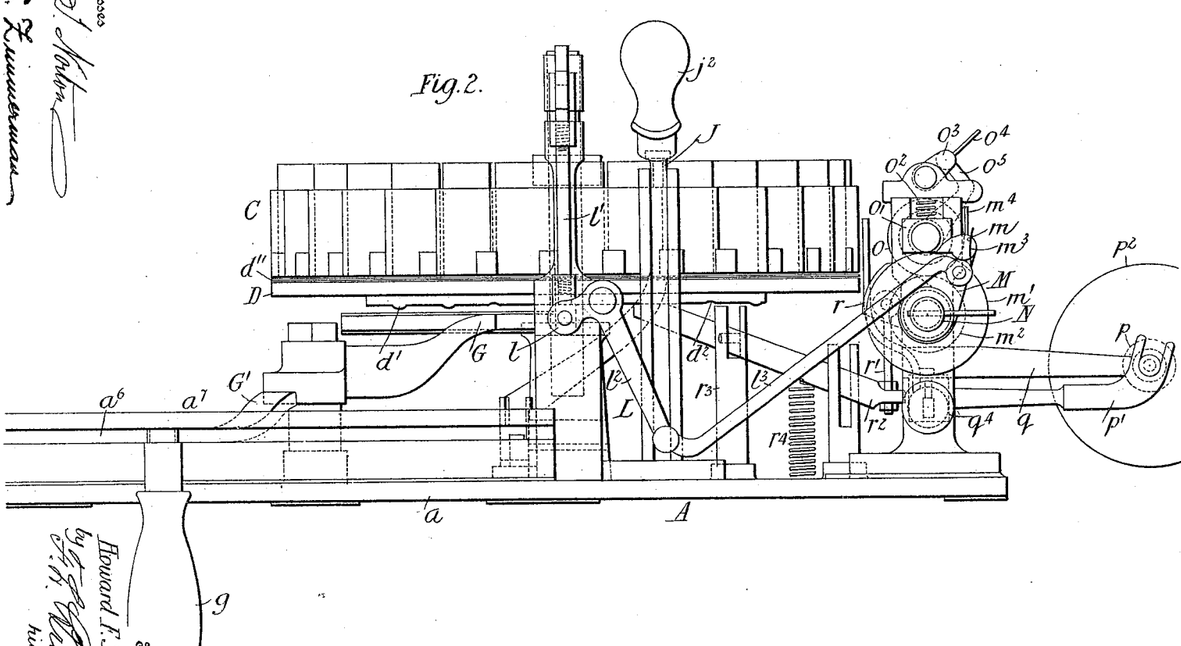
Fig. 2, a front elevation.
Figure 3:
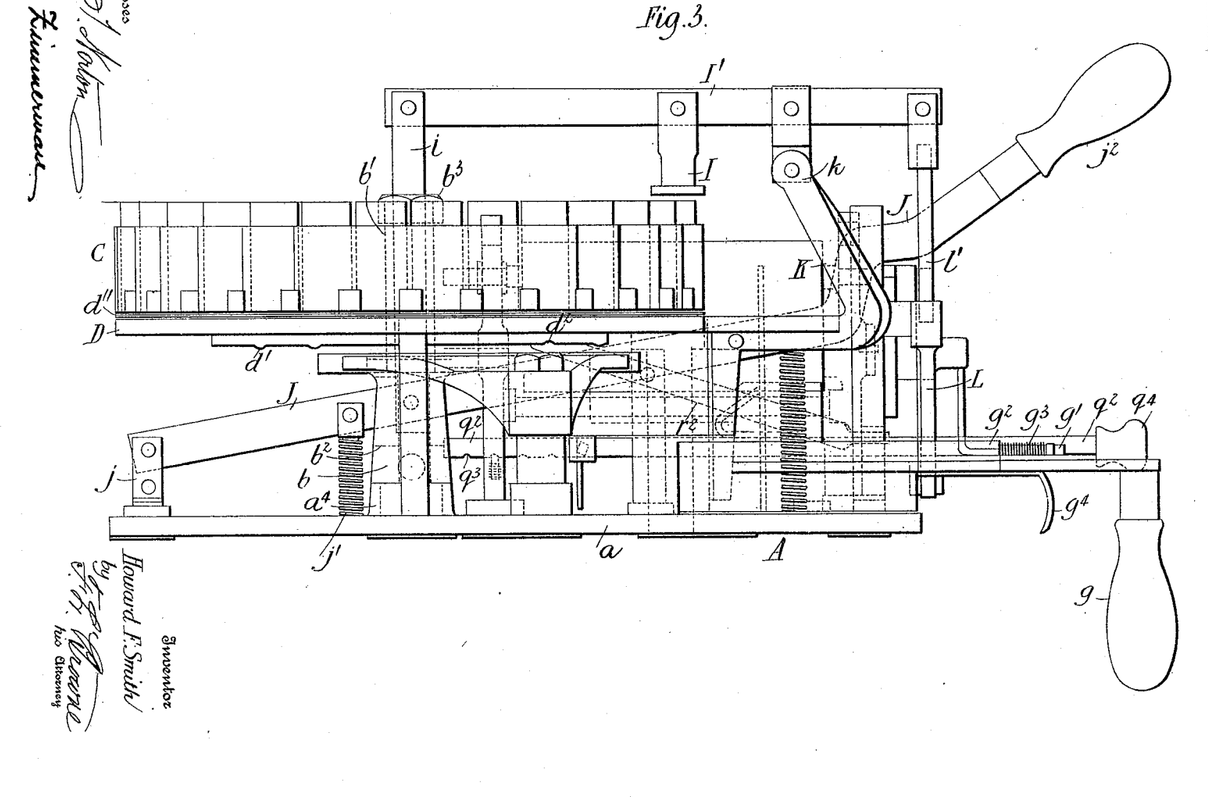
Fig. 3 is an elevation of the left-hand side of the machine.
Figure 4:
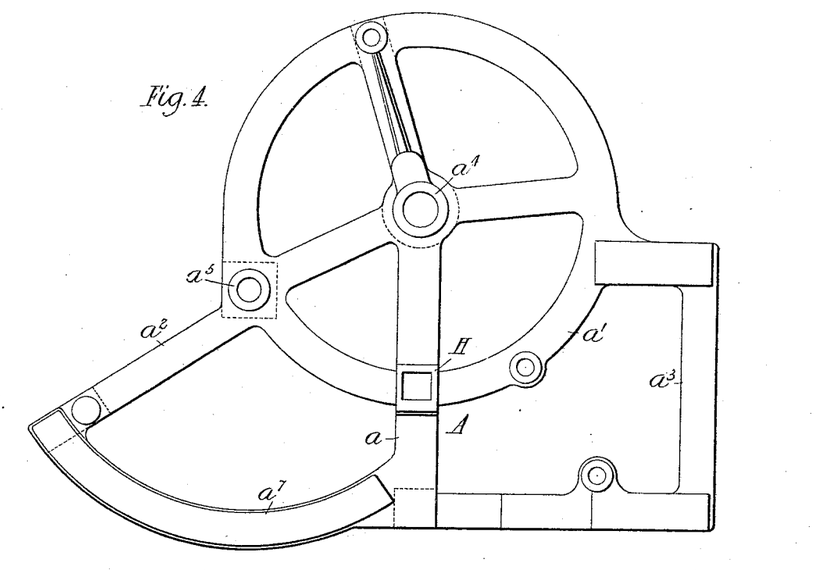
Fig. 4 is a plan view of the frame.
Figure 5:
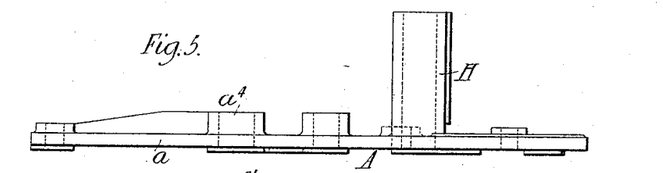
Fig. 5, a front elevation of the frame.
Figure 6:
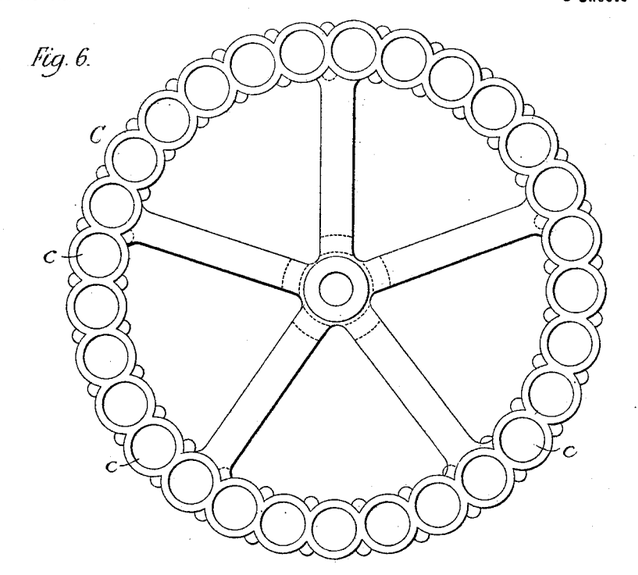
Fig. 6, a plan view of the punch-wheel.
Figure 7:
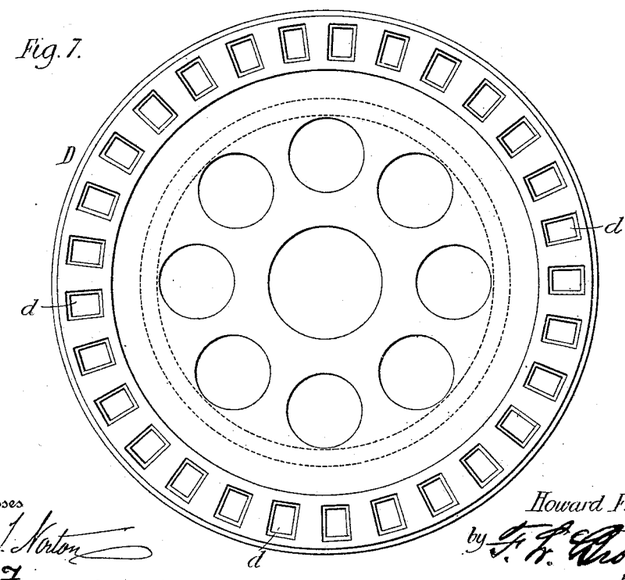
Fig. 7, a plan view of the die-wheel.
Figures 8, 9:
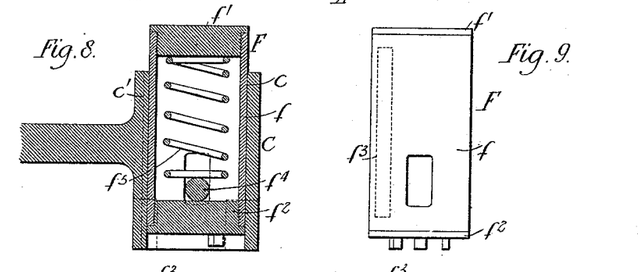
Fig. 8, a sectional view of the rim of the punch-wheel, showing a punch in section.
Fig. 9 is an elevation of one of the punches.
Figure 10:
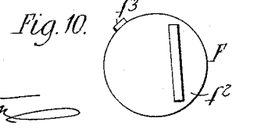
Figs. 10 and 11 are bottom plan views of two of the punches, showing the positions of certain of the letter characters.
Figure 11:
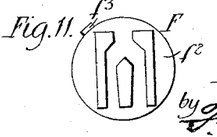

By reference to Figs. 10 and 11 it will be observed that the letters and other characters are located relatively differently on the punches, the variations of location being governed by the widths of the characters. The letter "M" is the standard both as to width and position, the right-hand edge of this letter governing the right-hand edge of each other letter or character, or, in other words, the right-hand edge of all the characters are similarly positioned with reference to the right-hand edge of the punch-bodies. The depressions $d^2$ on the under side of the die-wheel are in vertical alinement with the wider letters, while the projections $d'$ are in alinement with the narrower letters, the result being that when a wide letter, such as "M," is brought into punching position the inner end of the lever $r^2$ is elevated, while its outer arm, together with the cam $r$, is depressed to permit the pawl $m$ to engage and move the ratchet-wheel to feed the strip the proper distance, it being understood that the feed of the strip is always governed by the duration of contact between the pawl and ratchet-wheel $m'$. When a narrower letter, such as "I," is to be employed, a projection $d'$ engages the lever $r^2$ to cause the cam to disengage the pawl from the ratchet-wheel when the pawl reaches the predetermined point, and thereby feed the strip a proportionately less distance, and so on. A spring $r^4$ operates to maintain the inner end of the lever $r^2$ in the path of the series of governing projections and depressions.

$s$ denotes a locking-lever which is pivotally secured to one side of the anvil and is caused to engage any one of a series of recesses formed in the periphery of the die-wheel and to lock the latter by the action of a coiled spring $s'$. This lever is normally out of engagement with the recesses, its outer end being elevated and its inner end depressed against the action of the spring by contact with an arm $s^2$, carried by the lever J.

The operation is as follows: The material of the stencil coming from the roll or from any other source is passed between the feed-rollers and is guided by the fingers $q^5$ to a point between the punch and die wheels, the roll and fingers being set to bring that portion of the strip which is to be perforated in the path of the punches and dies. The strip being properly positioned for the first line, the first letter or other character punch is brought above it by the manipulation of the arm G' and intermediate connections, this being accomplished by swinging the arm to bring its finger into engagement with the proper notch on the segmental portion $a^7$. The lever J is now depressed, and the locking-lever $s$ being released the spring $s'$ moves it into engagement with one of the recesses, and the punch and die wheels are thus firmly held in proper position. The movement of the lever J through the bar I, lever L, and pawl and ratchet $m$ $m'$ causes the strip to be fed forward the proper distance, after which the punch is depressed to perforate the strip by the movement of the hammer through the manipulation of the lever J, rod $i$, and bar I'. The lever J is then released and raised by its spring, the punch is elevated, and the locking-lever $s$ moved to free the die-wheel, and the next character-punch is brought into position and operated, and so on until, say, a word is completed, after which a blank punch is presented to obtain the proper space between this word and the next character. As previously stated, provision is made for securing in the stencil properly-spaced characters regardless of their varying widths. Should a wide letter be presented to the strip, the feed-rolls are, through the employment of a depression in the under side of the die-wheel, the lever $r^2$, and its connection with the pawl $m$ and ratchet $m'$, rotated to feed the strip the proper distance, and when a narrow letter is presented the same means, together with a projection on the said wheel, operate to feed the strip a relatively less distance. If the perforated matter in the strip is to be arranged in different lines after a line is completed, the upper feed-roller is raised, and through the medium of the rod $q^2$ and arm $q$ the roll and guide fingers are moved to shift the strip transversely to present the new line.

From the foregoing it will be evident that the various steps of the operation may be rapidly performed without the exercise of skill and with the minimum of labor. The machine is comparatively simple in its construction, the parts few in number, and there is little or no liability to disorder. The machine may be produced at a low cost and may be supplied with an unlimited number of interchangeable punches and dies.

The material employed for the stencils is preferably paper; but any other thin sheet material may be used, whether it is capable of being reeled or not, as if such material is to be fed only in a flat state the roll flanges and fingers will still serve as guides therefor.

I claim as my invention—

1. In a machine of the class described, the combination of a series of punches and dies, means for effecting the movement of a punch and die into operative position, means for intermittently feeding a strip of material to the punch and die, punch-operating mechanism, and mechanism operated as a punch and die positioned for governing the feed of the strip to produce properly-spaced characters.

2. In a machine of the class described, the combination of a series of punches and dies, means for effecting the movement of a punch and die into operative position, punch-operating mechanism, means for intermittently feeding a strip of material to the punch and die said means being actuated by the punch-operating mechanism, and mechanism for governing the feed of the strip according to the widths of the characters controlled by devices movable with the punches and dies as the latter are being positioned.

3. In a machine of the class described, the combination of a series of punches and dies, means for effecting the movement of a punch and die into operative position, means for intermittently feeding a strip of material to the punch, said feed being governed by the varying widths of the characters, means for operating the punch to produce the perforation in the strip, and means for shifting the strip transversely to present a new line to be perforated, substantially as set forth.

4. In a machine of the class described, the combination of a series of punches and dies, means for operating the punches, strip-feeding mechanism actuated by the punch-operating means, means controlled by devices movable with the punches for governing the feed of the strip according to the widths of the characters, and means for shifting the strip transversely.

5. In a stencil-machine, the combination of a wheel having in its rim a plurality of openings, punches vertically movable in said openings each having a tubular body provided in its lower end with a removable plug having a character, a bridge-pin passed through the wheel-rim and through slots in the punch-body, a spring interposed between the pin and a plug in the upper end of the body, and a spline on the body engaging a groove in the wall of the opening to guide the punch.

6. In a stencil-making machine, the combination of a punch-wheel and die-wheel rotatably mounted on a tubular spindle, a punch-operating hammer, a lever carrying said hammer fulcrumed near one end adjacent to the wheels, a rod connected at the other end of the lever and vertically movable in the spindle, and an operating-lever connected with the lower end of the rod.

7. In a stencil-making machine, the combination of a punch-wheel and a die-wheel, a hollow spindle on which said wheels are mounted, a tubular anvil below the rim of the die-wheel, a hammer above the rim of the punch-wheel, a bar carrying said hammer fulcrumed near one end, a spring-controlled lever passed through slots in the spindle, and a rod movable in the spindle and connecting the lever and bar, substantially as set forth.

8. In a stencil-making machine, the combination with the strip-feeding rollers, of a ratchet-wheel carried by one of said rollers, a crank-arm loose on the shaft of said roller and carrying a pawl engaging said ratchet-wheel, a punch, a hammer for operating said punch, a bar carrying the hammer, said bar being pivoted near one end, a bell-crank lever having rod connection with said end of the bar and having rod connection with the crank-arm, and an actuating-lever operatively connected with the other end of the bar.

9. In a stencil-making machine, the combination with a die-wheel and punch-wheel rotatably mounted on a tubular spindle, strip-feeding rollers one of which is rotated by pawl-and-ratchet mechanism, a pivoted bar carrying a hammer for operating the punches, said bar being operatively connected at one end with the pawl-and-ratchet mechanism, a rod connected with the other end of the bar vertically movable in the spindle, and an actuating-lever connected with said rod.

10. In a stencil-making machine, the combination of strip-feeding rollers one of which is fixed to a shaft and is provided with means for its intermittent rotation, and the other of said rollers being journaled in spring-controlled movable bearings, and means for raising and lowering said other roller comprising a pivoted crank-arm and handle, and a curved rod connecting the outer end of the crank-arm and the roller-shaft, whereby the crank-arm may be moved beyond the dead-center to hold the roller in raised position.

11. In a stencil-making machine the combination with a wheel carrying punches in its rim, and a die-wheel therefor, of strip-feeding rollers, mechanism for intermittently actuating said rollers, and means for governing the feed of the strip to produce properly-spaced characters, consisting of depressions and elevations at the characters of varying widths, and a lever one end of which is in the path of the depressions and elevations, the other end being operatively connected with the roller-actuating mechanism.

12. In a stencil-making machine, the combination with a punch-wheel and die-wheel, means for moving said wheels to position, a punch and die, a hammer, a spring-controlled lever operatively connected with said hammer a spring-controlled locking-lever normally held out of engagement with said wheels by engagement with the aforesaid lever but adapted to be carried into locking position when released by the movement of the said lever, substantially as set forth.

13. In a stencil-making machine, in combination with a wheel carrying punches in its rim, and a die-wheel having depressions and elevations at the characters of varying widths, strip-feeding rollers, pawl-and-ratchet mechanism operatively connected with a movable part of the machine for intermittently rotating said rollers, and a spring-controlled lever, one end of which is in the path of the said depressions and elevations, and a cam operatively connected with the other end of the lever and adapted when moved to control the period of engagement of the pawl with the ratchet-wheel in the manner and for the purpose substantially as set forth.

14. In a stencil-making machine, the combination of the die-wheel having on its under side an annular series of depressions and projections in alinement with characters of unusual widths, strip-feeding rollers one of which carries a ratchet-wheel, a crank-arm loose on the shaft of said roller carrying a pawl in engagement with the ratchet-wheel, a cam movable to engage the pawl, a spring-controlled lever one end of which is in the path of the depressions and projections and the other end of which has rod connection with the cam, substantially as set forth.

15. In a stencil-making machine, the combination of the strip-feeding rollers, a strip-roll slidably mounted to the rear of said rollers, a slidable rod, an arm rigid with said rod and engaging said roll, and guide-fingers on said rod, substantially as described.

In testimony whereof I affix my signature in presence of two witnesses.

HOWARD F. SMITH.

Witnesses:
CORA HEALD,
HATTIE M. ISBELL.